Patented June 8, 1954

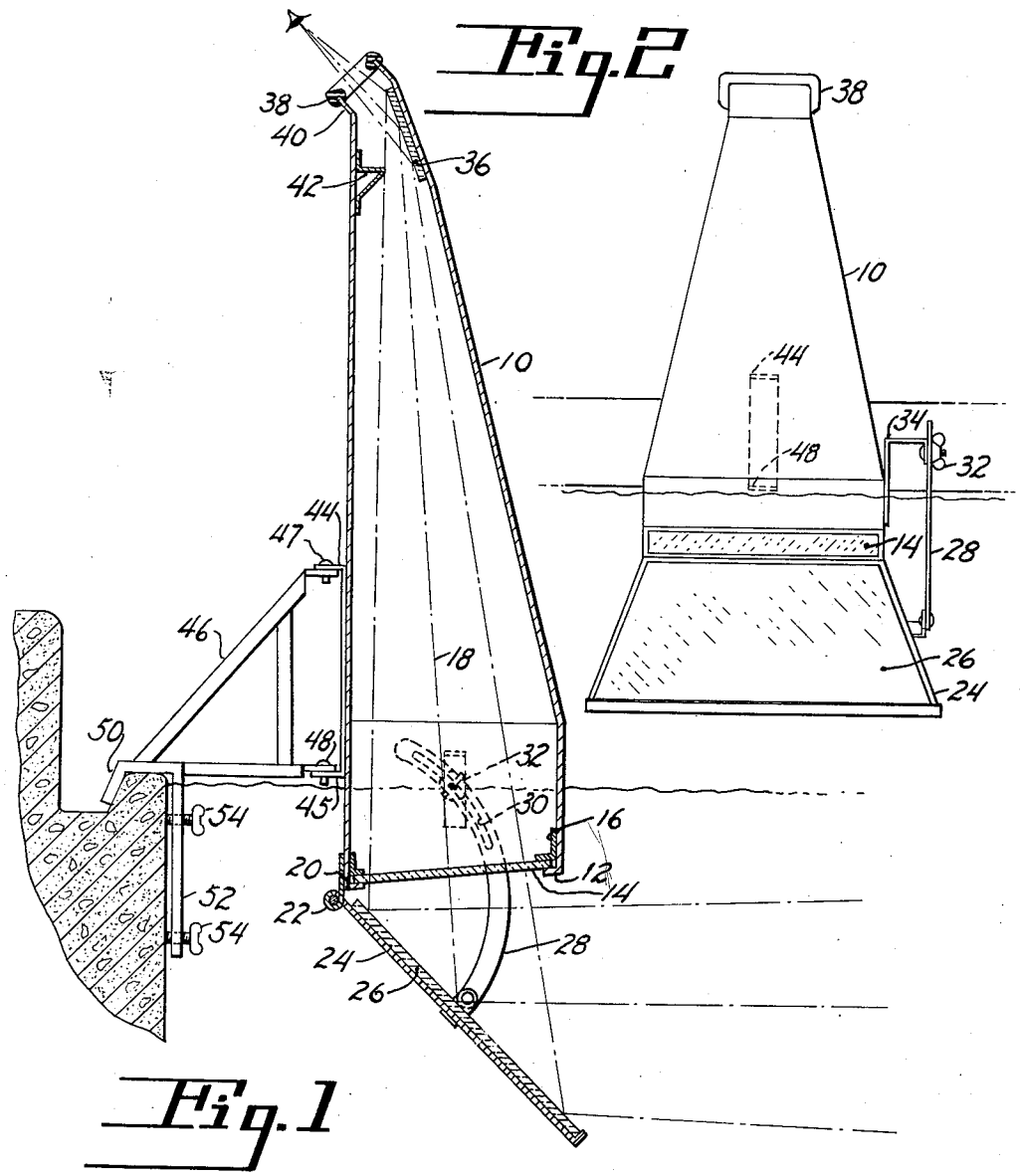

2,680,398

UNITED STATES PATENT OFFICE 2,680,398

UNDERWATER PERISCOPE

Joseph P. Kohut, New Brunswick, N. J.

Application June 21, 1951, Serial No. 232,765

4 Claims. (Cl. 88—68)

This invention relates to periscopes in general, and provides, in particular, a portable and adjustable device for viewing objects which are under water from a point above the surface of the water.

The invention has particular utility in the observation and coaching of swimmers during training, and in observing various sorts of underwater action, either from the side of a swimming pool or other stable support. The device may also be used on boats, and it is easily portable.

One of the problems in coaching swimmers in proper form and in observing sub-surface action during life-saving tests and the like, is to secure complete visibility of the sub-surface action taking place. This cannot be had from viewing the action from above the surface of the water, since waves and the difference in refractive index between air and water distort the observed objects. Some special pool installations have been made with sub-surface observation windows. While these are good, they are likewise expensive, and have a disadvantage of distorting perspective when the line of sight departs substantially from a normal to the plane of the observation window.

The device of this invention finds particular utility in pools where no sub-surface observation facilities are permanently installed. Furthermore, it may be constructed of conventional and readily available materials, and is within reach, costwise, of the majority of individuals and organizations who have need for an underwater observation instrument.

An object of the invention is to provide a simple inexpensive underwater observation instrument having great flexibility. Other objects will become apparent as a detailed description proceeds.

In the drawings, in which similar reference characters designate similar parts,

Fig. 1 is a section through the instrument, and

Fig. 2 is a front view of the instrument as it might be seen from the water.

My underwater observation instrument or device comprises a more or less pyramidal shaped four-sided sheet metal housing member 10, at the lower end of which are inbent shelves 12 to support a glass plate 14. The plate is held in position by sealing compound or gaskets, to avoid water entry within the housing, and is retained by angle brackets 16 suitably secured to the housing. The plane of the glass 14 is substantially normal to the line 18 which may be considered as the optical axis of the instrument. This axis is tilted relative to the vertical, and likewise, the glass 14 is slightly tilted from the horizontal. When the lower end of the instrument is submerged, any bubbles entrained on the glass will float to the upper edge of the glass. Also, since the axis 18 is normal to the glass, the under surface of the glass 14 being wholly wetted by immersion, there will be substantially no distortion in refracted images which otherwise might occur due to the substantial difference in the index of refraction between air and water.

To the lowermost edge 20 of the housing 10, a hinge 22 is secured upon which a plate 24 is mounted. This plate carries a mirror 26, secured by clips or by cementing and the mirror will normally be set at an angle of about 45° to the vertical. However, to enable observation of underwater phenomena over a wide range of depths, the mirror 26 may be tilted on the hinge 22 from angles of about 40° to 60°. A quadrant 28 is secured to the plate 24 and a slot 30 therein may be engaged by a thumb screw 32 carried by a small bracket 34 secured to one of the side plates of the housing. If no variation in depth of observation is desired, the mirror plate 24 may be fixedly secured to the housing 10 by gusset plates in place of the adjustable quadrant.

The mirror 26 is preferably trapezoidal in form with the shorter of its two parallel sides adjacent the hinge 22 and the longer of its two parallel sides depending beneath the water. By virtue of this mirror shape, the image projected from the mirror up through the housing 10 will have rectangular form.

At the upper end of the housing 10, a second mirror 36 is secured, this mirror preferably lying at an angle of from 70° to 80° to the plane of the plate 14 so that images reflected from the mirror 26 can be observed from a point above and to the side of the instrument as indicated by the eye image in Fig. 1. The upper mirror 36 serves to correct the inverted image reflected by the mirror 26 so that the observed objects appear in the mirror 26 in normal upright position. A rubber grommet 38 may be provided around the upper end of the housing 10 for eye and face protection. Also, the upper end of the housing is conformed as shown at 40 to indicate the proper direction from which the mirror 36 should be observed to encompass the entire field of view afforded by the mirror system. A small light baffle 42 is provided along the rear wall of the housing 10 so that the proper position for observation may be established to enable an observer to utilize the full scope of the instrument, and also to prevent an observer from looking directly down into the instrument toward the lower mirror which would yield an inverted image. The inside of the instrument is preferably painted a dull black to avoid reflections from the walls. The lower submerged mirror is considerably larger than the upper mirror to yield a wide field of view without the use of a lens system which would make the instrument delicate and more costly. A practical small-sized instrument of this type utilizes a lower submerged mirror approximately 9 by 18 inches, a glass plate 14 of approximately 6 by 15 inches, and an upper mirror about 4 by 5 inches, the height of the entire instrument being about three and one-half feet.

The rear portion of the housing 10 is provided with metal fittings 44 and 45 adapted to be pivotally attached to a bracket structure 46 by means of pivot screws or pins 47 and 48. The bracket is constructed with a hooked upper end 50 and a depending strut 52 so that the entire instrument assembly may be hooked over the gutter of the conventional swimming pool. Wing screws 54 are provided in the leg 52 to adjust the bracket element snugly on the pool edge so that it is free from wobbling.

In use the instrument is hung on the edge of the pool as above indicated and an observer may stand on the pool edge observing underwater action through the instrument. The instrument may be rotated about the pivots 47, 48 so that the entire length of the pool may be scanned. Thereby, a thorough view of underwater objects is secured. In particular, in coaching swimming, a student swimmer may swim back and forth along the usual 25 yard pool and a coach may observe his every action since his body is predominantly below the surface. Thus the coach is able to observe defects in form and to apprise the students of these defects to increase their proficiency. Also, accurate observation of underwater action may be had during tests for life-saving qualifications and the like to assure observers and coaches that a candidate for life-saving award is performing all of his test feats with skill and propriety.

An additional feature of the disclosed device includes buoyancy. The wholly submerged lower mirror, along with the housing, has sufficient weight to partially submerge the instrument, and if it is left free in the water, it will float in a stable upright position with the upper end protruding from the water. This arragement assists an observer in installing the instrument on a supporting structure, and prevents complete immersion and sinking of the instrument. Clearly, the whole housing structure is made watertight and the instrument may be built quite ruggedly to withstand normal handling by unskilled people, while yielding effective results.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. A viewing device for visually scanning objects beneath the surface of water from a point thereabove comprising a substantially vertical hollow member, a sloped mirror near the upper end of the member, a substantially horizontal but slightly tilted glass plate water-tightly sealed at the lower end of the member, said plate being substantially normal to a line of sight from the mirror center through the plate center and said plate being tilted to enable dispersion of bubbles collected thereon upon immersion of the device to the uppermost part of the plate, a sloped normally wholly submerged mirror of trapezoidal shape with its shorter base secured to the member adjacent one edge of said plate and lying beneath and outside of said hollow member, said submerged mirror having its reflecting surface uppermost and positioned to reflect images of objects beneath the water surface substantially vertically through said plate to said upper mirror.

2. A viewing device for visually scanning objects beneath the surface of water from a point thereabove comprising a substantially vertical hollow member, a sloped mirror near the upper end of the member, a substantially horizontal but slightly tilted glass plate water-tightly sealed at the lower end of the member, said plate being substantially normal to a line of sight from the mirror center through the plate center and said plate being tilted to enable dispersion of bubbles collected thereon upon immersion of the device to the uppermost part of the plate, a sloped normally wholly submerged mirror of trapezoidal shape with its shorter base secured to the member adjacent one edge of said plate and lying beneath and outside of said hollow member, said submerged mirror having its reflecting surface uppermost and positioned to reflect images of objects beneath the water surface substantially vertically through said plate to said upper mirror, and bracket means securable to a stationary object such as the side of a swimming pool upon which said hollow member is pivoted on a substantially vertical axis to enable the device to be traversed laterally, a line normal to said glass plate being slightly acutely angled relative to said vertical axis of the bracket to assure tilting of said plate and dispersion of bubbles therefrom.

3. A viewing device for observation of underwater objects from above the surface of water comprising a substantially vertical hollow member whose lower end is adapted to be submerged and whose upper end is adapted to lie above the water surface, a set of sloped mirrors, one within and near the top of the member and one secured beneath and outside of the member and adapted to be wholly submerged, a glass plate secured in sealed relation to the bottom of the member above said lower mirror and between said mirrors so that its lower surface may be wholly wetted, said plate being tilted slightly from the horizontal whereby bubbles collecting thereon during immersion may float to the uppermost plate edge, the plane of said plate being substantially normal to a line connecting the centers of said mirrors, and a substantially vertical-axis pivot bracket secured to said member for mounting the device on a suitable support, a line normal to said glass plate having a small acute angle to said vertical-axis pivot to assure tilting of said plate and dispersion of bubbles therefrom.

4. A viewing device for observation of underwater objects from above the surface of water comprising a substantially vertical hollow member whose lower end is adapted to be submerged and whose upper end is adapted to lie above the water surface, a set of sloped mirrors, one within and near the top of the member and one secured beneath and outside of the member and adapted to be wholly submerged, a glass plate secured in sealed relation to the bottom of the member above said lower mirror and between said mirrors so that its lower surface may be wholly wetted, said plate being tilted slightly from the horizontal whereby bubbles collecting thereon during immersion may float to the uppermost plate edge, the plane of said plate being substantially normal to a line connecting the centers of said mirrors, and a substantially vertical-axis pivot bracket secured to said member for mounting the device on a suitable support, said lower mirror being substantially trapezoidal in planform with the shorter of its two parallel sides secured to said member adjacent an edge of said glass plate, a line normal to said glass plate having a small acute angle to said vertical-axis pivot to assure tilting of said plate and dispersion of bubbles therefrom.

References Cited in the file of this patent

UNITED STATES PATENTS

| Number | Name | Date |
|---|---|---|
| 1,156,782 | Jenkins | Oct. 12, 1915 |
| 1,207,418 | Lazarte | Dec. 5, 1916 |
| 1,480,112 | Poppenhusen | Jan. 8, 1924 |
| 1,521,339 | Taylor | Dec. 30, 1924 |
| 1,578,958 | Daoust | Mar. 30, 1926 |
| 2,252,640 | Nuchterlein | Aug. 12, 1941 |
| 2,516,897 | McCullough | Aug. 1, 1950 |

FOREIGN PATENTS

| Number | Country | Date |
|---|---|---|
| 187,608 | Germany | Aug. 6, 1907 |